UNITED STATES PATENT OFFICE.

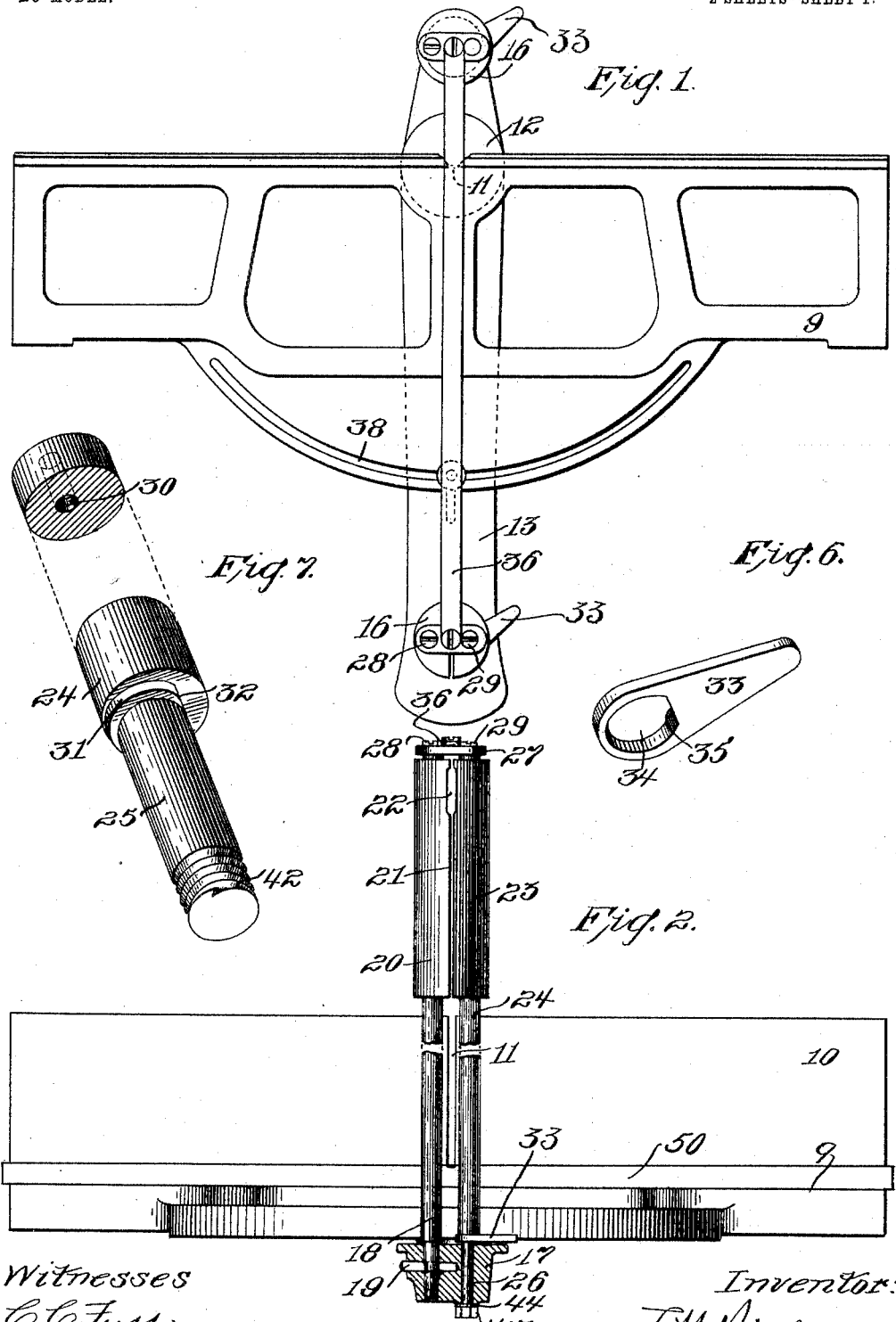

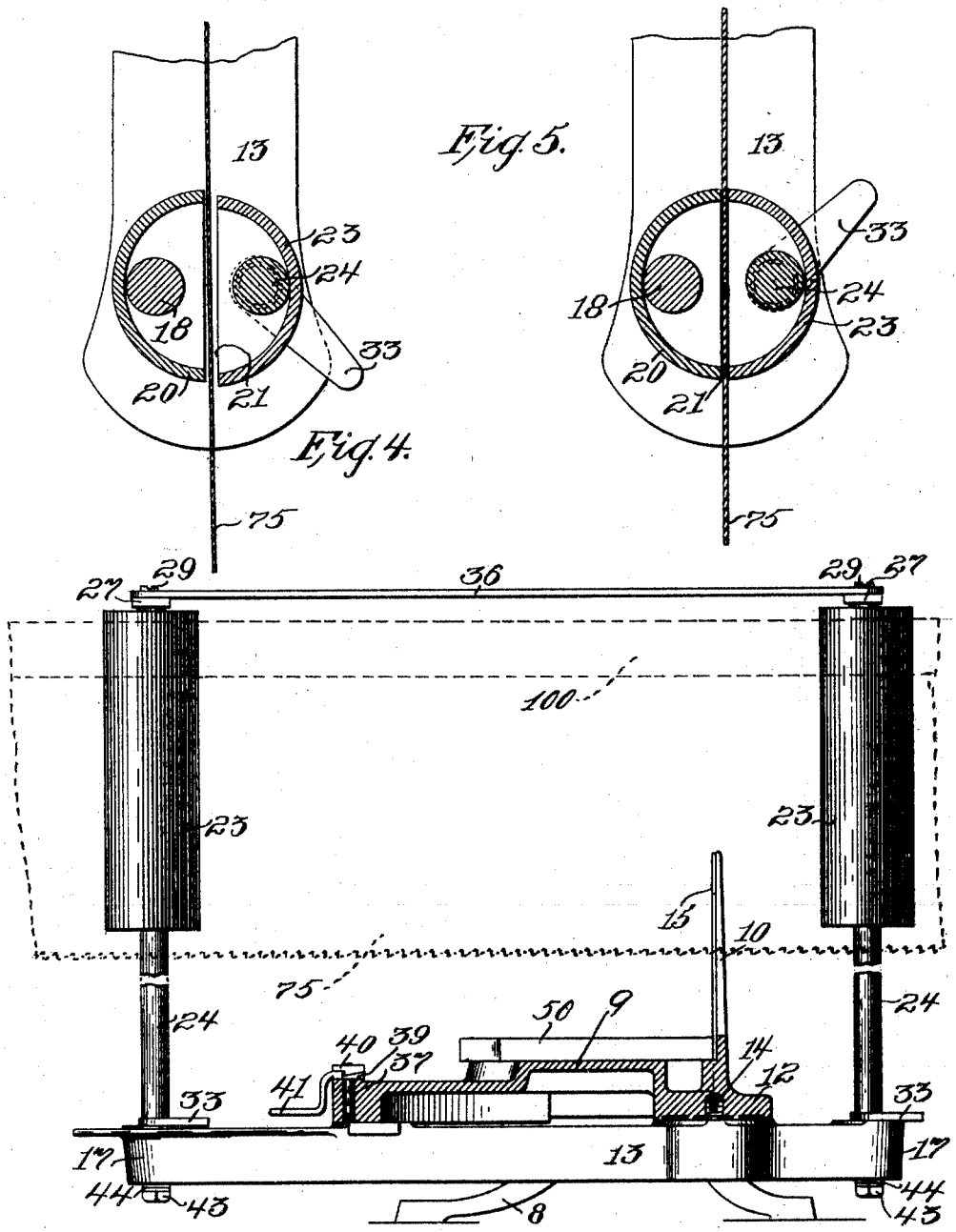

FRANCIS H. RICHARDS, OF HARTFORD, CONNECTICUT, ASSIGNOR TO THE STANLEY RULE & LEVEL COMPANY, OF NEW BRITAIN, CONNECTICUT, A CORPORATION OF CONNECTICUT.

SAW-GUIDE.

SPECIFICATION forming part of Letters Patent No. 766,796, dated August 2, 1904.

Application filed October 2, 1903. Serial No. 175,427. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Saw-Guides, of which the following is a specification.

This invention relates to and has for an object to provide an improved guide for a hand-saw. In various wood-sawing mechanisms, such as miter-boxes, the saw must be guided and positioned relatively to certain work-positioning parts and the saw be supported upon each side of its blade in such a manner that after the guides have been set the cut of the saw will be positively controlled. In miter-boxes the saw-guides will frequently be carried by a frame or arm pivoted to the box or framing, which box or framing will generally have a back to position the work and from which back the angles of the cut will be reckoned. For facility in so doing the frame carrying the guides will be pivoted so that the axis of its pivot will lie in the plane of the angles can be computed from such face. In positioning-face of the back. Consequently the practice the front end of the arm carrying the guides will have some means of determining by a fixed scale the various bevels which will generally be employed in using the box, and frequently an index pin or bolt will be carried by such frame to mate with corresponding bolt-holes in the main frame of the machine, whereby the center of such pin and the center of the pivot of the frame will be on a line indicating the angle of the desired bevel. If the saw is guided upon such line or upon a line intersecting such line and in which plane the line of the axis of the pivot of the frame will lie, the cut of the saw will then be at the desired angle to the back portion—that is, assuming the bolt or index holes to be accurately placed on the frame. The saw will, however, cut the desired angle if it is at any position in parallelism with such plane irrespective of its distance therefrom.

Saws vary in thickness, similar saws of different manufactures being of slightly-different thickness, and saws of different sizes of the same manufacture may vary as to thicknesses. Consequently to produce accurate results it is desirable to have the saw-guides adjustable—that is, to have the guide upon one side of the saw adjustable relatively to the guide upon the other side, so that the thickness in saw-blades may be compensated for. Sometimes in working with a miter-box or other saw-controlling device it may be desired to give the saw more freedom than at other times to compensate for the peculiarities of the wood or to enable the workman to work more rapidly without heating the saw or he may desire great accuracy and to control the saw without any play. For all of which reasons an adjustable saw-guide is most desirable as also to compensate for the wear of the guides by use.

This present improvement provides means for adjusting the guides upon the same side of the saw-blade and wherein the guides upon one side are made stationary and fixed and the guides upon the other side are made adjustable toward and from the fixed guides.

The saw-guides may each comprise a split cylinder, the halves of which are guided by parallel rods and the rods to support the halves on one side of the saw be rigidly supported, and to accomplish individual adjustment of the corresponding sides of both guides the rods on which the other halves are mounted may be provided with eccentrically-disposed pins on their ends and the pins supported in fixed relation to the rigid rods whereby each adjustable half is carried by a crank held in parallelism to the rigid rod.

In the drawings accompanying and forming part of this specification a form of my invention is illustrated, wherein—

Figure 1 is a plan view of a miter-box provided with my invention, the board floor and legs being absent. Fig. 2 is a front view thereof. Fig. 3 is a cross-section, some of the parts shown in elevation. Fig. 4 is a cross-section of the guide, showing it in an open position. Fig. 5 is a similar section showing it in a closed position. Fig. 6 is a perspective of an operating-arm, and Fig. 7 is a perspective of the eccentric-rod broken to reveal the screw-hole at one end.

The frame of the miter-box illustrated herein is shown as supported by legs 8 and having a floor portion 9, from which a back 10 projects, and through the back is shown a saw-opening 11. A board 50 may be placed on the floor portion 9 to protect the teeth of the saw. In Fig. 1 the frame is shown with such board removed. A hub 12 is carried below the back and floor and to which is pivoted a beam-arm 13, carrying saw-guides. The pivot 14 of the beam has the line of its axis on the line of the center of the saw-opening 11, and the line of such axis lies in the plane of the guiding or positioning surface 15 of the back member. A pair of guides 16 16 are carried by the beam or frame 13 at its front and back ends, respectively, and are substantially similar.

The beam has at each end a hub or enlargement 17, having rigidly or stationarily seated therein a bar or guide-rod 18, held in the present instance by a pin 19, driven through the side of the hub and the rod. Upon the guide-rod 18 one side member 20 of the saw-guide, which in practice may be a cylinder, is mounted, which guide has a face 21 for guiding the side of the saw-blade. (Designated in a general way by 75 and shown in dotted lines in Fig. 3 and in section in Figs. 4 and 5.) The guide is cut away, making an opening 22 for permitting the passage of the back bar of a backed saw. The back bar is designated in a general way by 100 on the dotted-line representation of the saw in Fig. 3. A similar member 23, forming the other half of the saw-guide, is mounted upon a rod or guide-bar 24, having an eccentric portion or pin 25, which is mounted in a bearing 26 in the hub 17. The upper ends of the rods 18 and 24 are supported by a cap or yoke 27. The cap is secured to the rod 18 by means of a screw 28, and the rod 24 is provided at its upper end with a crank-pin, in the present instance a screw 29, entering a screw-hole 30 in such rod eccentric thereto, but concentric with the pin 25, and controlled by the yoke or cap 27, whereby upon rotation of the rod it will act as a crank upon the centers of the pins 25 and 29 and move its half 23 of the guide-cylinder toward and from the half 20, and consequently reduce or increase the saw-blade space between such halves. The base in which the rod 18 and pin 25 are mounted, in the present instance the hub 17, securely binds the guide-rods together at one end, and the yoke 27 likewise binds the said guide-rods together at the other end. It will thus be seen that the guide-rods for each guide, comprising a guide-face for opposite sides of the saw, are united with stability at both ends, and whereby one rod will coöperate with the other to withstand strains. For the purpose of shifting the guide-rod it is shown as having a shoulder 31, having on one side a flat face 32 and upon which a handle 33, having a circular opening 34 and a flat face 35, may be forced. The caps or yokes 27 of the two guides may be connected by means of a tie-rod 36, so that jar or strain upon one guide will not be entirely borne by it, but will be received partially by the other guide, and will generally work for the strength and stability of the machine.

Any suitable means may be employed for holding the beam-arm or guide-frame in the desired position. In the present instance a post 37 is carried by the beam and runs in a sector-slot 38 in a segmental protrusion of the frame and is clamped by means of a pair of cam-washers 39 40, one of which, 39, is controlled by a lever 41 and the other, 40, is fast on the post 37.

The eccentric-pin 25 may have a screw-threaded end 42 passing through the beam and held in place by a nut 43 and washer 44, by which means, as also by tightening the screw 29, the rod 24 may be locked in its adjusted position.

In practice various modifications may be employed and changes made from the form of my invention illustrated herein without departing from the spirit of my invention.

The feature of the apron illustrated herein is claimed in my copending application, Serial No. 175,425, filed October 2, 1903.

Having thus described my invention, I claim—

1. A saw-guide comprising means to guide one side of a saw-blade; a rod upon which the same is shiftable; a block in which said rod is rigidly mounted; a cap or yoke secured to the other end of said rod; means to guide the other side of said saw-blade; a rod upon which the same is shiftable; a crank-pin upon said rod supported by said yoke; a crank-pin upon the other end of said rod concentric with the former pin; a bearing in said block for said latter pin, and means to oscillate the rod upon its crank-pins to adjust the saw-guiding means toward and from each other.

2. A miter-box comprising a frame to position the work; a guide-carrier mounted thereon; a pair of saw-guides carried thereby each comprising means to guide one side of a saw-blade; a rod upon which the same is shiftable, a block in which said rod is rigidly mounted, a yoke secured to the other end of said rod, means to guide the other side of said saw-blade, a rod upon which the same is shiftable, a crank-pin upon said rod supported by the yoke, a crank-pin upon the other end of said rod concentric with the former pin, a bearing in the block for said latter pin, means to oscillate the rod upon its crank-pins to adjust the saw-guiding means toward and from each other; and means to connect the yokes.

3. In a miter-box, the combination with a support for the work, of means to carry saw-guides, a pair of saw-guides carried thereby, each comprising supporting-rods and members having saw-blade-guiding faces and saw-back-clearance faces, means to rigidly support one end of one of said rods in each pair, and means to support the other end of said rod of each pair, crank-pins on the ends of the other rod of said pair and supported by the means to support the respective ends of the other rod, and means to oscillate said eccentrically-supported rods upon the crank-pins.

4. In a miter-box, the combination with means to carry saw-guides, of a number of saw-guides carried thereby, each comprising a pair of plates to engage the respective sides of the saw-blade, a pair of guide-rods to carry said plates, one of said rods having crank-pins on its ends, one of said crank-pins and one end of the other rod being seated in the carrying means, and means to unite the other crank-pin and the other end of said rod, whereby the rods of each pair are securely united at both ends.

5. In a miter-box the combination with a work-support, and a saw-guide support, of saw-guides each comprising a pair of members having saw-guiding faces, a guide rigidly mounted in said support and upon which one of said pair of members is mounted, a guide upon which the other of said members is mounted and which guide eccentrically carries a pair of concentric journals one of which journals is mounted in the said support, and a yoke to unite the free end of the rigidly-mounted guide to the other of said journals; and a tie-bar to unite said yokes.

6. In a miter-box the combination with a work-support, and a saw-guide support, of saw-guides each comprising a pair of members having saw-guiding faces, a member rigidly mounted in said support and upon which one of said pair of plates is mounted, a member upon which the other of said plates is mounted and which member eccentrically carries a pair of concentric journals one of which journals is mounted in the said support, and means to unite the free end of the rigidly-mounted member to the other of said journals.

7. In a miter-box the combination with a work-support, and a saw-guide support, of saw-guides each comprising a pair of members having saw-guiding faces, a guide rigidly mounted in said support and upon which one of said pair of members is mounted, a guide upon which the other of said members is mounted and which guide eccentrically carries a pair of concentric journals one of which journals is mounted in the said support, and means to unite the free end of the rigidly-mounted guide to the other of said journals.

Signed at Nos. 9 to 15 Murray street, New York, N. Y., this 19th day of September, 1903.

FRANCIS H. RICHARDS.

Witnesses:
   CHAS. L. RUSSELL,
   FRED. J. DOLE.